(12) United States Patent
Iwafuchi et al.

(10) Patent No.: US 8,976,413 B2
(45) Date of Patent: Mar. 10, 2015

(54) COLOR PROCESSING FOR CONVERTING AN INPUT COLOR GAMUT INTO AN OUTPUT COLOR GAMUT IN ACCORDANCE WITH A SET COMBINATION OF INK DROPLET DIAMETERS

(71) Applicant: Fuji Xerox Co., Ltd., Minato-ku, Tokyo (JP)

(72) Inventors: Toshihiro Iwafuchi, Kanagawa (JP); Hidetoshi Kawashima, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 85 days.

(21) Appl. No.: 13/665,136

(22) Filed: Oct. 31, 2012

(65) Prior Publication Data
US 2013/0308144 A1 Nov. 21, 2013

(30) Foreign Application Priority Data

May 16, 2012 (JP) .................................. 2012-112586

(51) Int. Cl.
*G06K 1/00* (2006.01)
*H04N 1/60* (2006.01)

(52) U.S. Cl.
USPC ........... 358/1.9; 358/502; 358/3.12; 358/518; 358/536

(58) Field of Classification Search
CPC combination set(s) only.
See application file for complete search history.

(56) References Cited

U.S. PATENT DOCUMENTS

| | | | | |
|---|---|---|---|---|
| 6,161,919 A | * | 12/2000 | Klassen | 347/43 |
| 2005/0200866 A1 | * | 9/2005 | Hoshii et al. | 358/1.9 |
| 2010/0231978 A1 | * | 9/2010 | Chandu et al. | 358/3.09 |

FOREIGN PATENT DOCUMENTS

JP 2006-035546 A 2/2006

* cited by examiner

*Primary Examiner* — Barbara Reinier
*Assistant Examiner* — Christopher D Wait
(74) *Attorney, Agent, or Firm* — Sughrue Mion, PLLC

(57) ABSTRACT

A color processing apparatus includes an obtaining unit, a setting unit, and a color converting unit. The obtaining unit obtains a predetermined corresponding relationship between total amount limit information regarding limitation of a total amount of inks of colors, and a combination in which, among droplet diameters of inks of colors ejectable to satisfy the total amount limit information, droplet diameters of at least two or more inks are made uniform, and the types of droplet diameters of inks of the colors are two or fewer types. The setting unit sets the combination of droplet diameters corresponding to the accepted ink total amount limit information, on the basis of the obtained corresponding relationship. The color converting unit converts a color in an input color gamut reproducible by an input device into a color in an output color gamut in accordance with the set combination of droplet diameters.

5 Claims, 7 Drawing Sheets

FIG. 3

TBL

| No. | C | M | Y | K | TOTAL AMOUNT LIMIT VALUE |
|---|---|---|---|---|---|
| 1 | LARGE | LARGE | LARGE | LARGE | 400 |
| 2 | LARGE | LARGE | MEDIUM | LARGE | 360 |
| 3 | LARGE | MEDIUM | LARGE | LARGE | 350 |
| 4 | MEDIUM | LARGE | LARGE | LARGE | 340 |
| 5 | LARGE | MEDIUM | MEDIUM | LARGE | 310 |
| 6 | MEDIUM | LARGE | MEDIUM | LARGE | 300 |
| 7 | MEDIUM | MEDIUM | LARGE | LARGE | 290 |
| 8 | MEDIUM | MEDIUM | MEDIUM | LARGE | 250 |
| ... | ... | ... | ... | ... | ... |

| No. | C | M | Y | K | TOTAL AMOUNT LIMIT VALUE |
|---|---|---|---|---|---|
| 1 | LARGE | LARGE | LARGE | LARGE | ≥ 200 |
| 2 | MEDIUM | MEDIUM | MEDIUM | LARGE | 190 |
| 3 | MEDIUM | SMALL | SMALL | LARGE | 180 |
| 4 | MEDIUM | SMALL | SMALL | MEDIUM | 170 |
| 5 | SMALL | SMALL | SMALL | SMALL | < 170 |

| DROPLET DIAMETER | C | M | Y | K |
|---|---|---|---|---|
| LARGE | 100 % | 100 % | 100 % | 100 % |
| MEDIUM | 80 % | 85 % | 90 % | 90 % |
| SMALL | 60 % | 70 % | 80 % | 80 % |

FIG. 5

| No. | C | M | Y | K | TOTAL AMOUNT LIMIT VALUE | INK AMOUNT CONDITION |
|---|---|---|---|---|---|---|
| 1 | LARGE | LARGE | LARGE | LARGE | 280 | 10(MAX) |
| 2 | LARGE | LARGE | MEDIUM | LARGE | 260 | 9 |
| 3 | LARGE | MEDIUM | LARGE | LARGE | 240 | 8 |
| 4 | LARGE | MEDIUM | MEDIUM | LARGE | 220 | 7 |
| 5 | MEDIUM | MEDIUM | MEDIUM | LARGE | 200 | 6 |
| 6 | MEDIUM | MEDIUM | MEDIUM | MEDIUM | 180 | 5 |
| ⋮ | ⋮ | ⋮ | ⋮ | ⋮ | ⋮ | ⋮ |
| 10 | SMALL | SMALL | SMALL | SMALL | 100 | 1(Min) |

TBL

COLOR PROCESSING FOR CONVERTING AN INPUT COLOR GAMUT INTO AN OUTPUT COLOR GAMUT IN ACCORDANCE WITH A SET COMBINATION OF INK DROPLET DIAMETERS

CROSS-REFERENCE TO RELATED APPLICATIONS

This application is based on and claims priority under 35 USC 119 from Japanese Patent Application No. 2012-112586 filed May 16, 2012.

BACKGROUND

Technical Field

The present invention relates to a color processing apparatus and method, and to a non-transitory computer readable medium.

SUMMARY

According to an aspect of the invention, there is provided a color processing apparatus including an obtaining unit, a setting unit, and a color converting unit. The obtaining unit obtains a predetermined corresponding relationship between total amount limit information regarding limitation of a total amount of inks of multiple colors, and a combination in which, among droplet diameters of inks of multiple colors ejectable to satisfy the total amount limit information, droplet diameters of at least two or more inks are made uniform, and the types of droplet diameters of inks of the multiple colors are two or fewer types. The setting unit sets the combination of droplet diameters corresponding to the accepted ink total amount limit information, on the basis of the corresponding relationship obtained by the obtaining unit. The color converting unit converts a color in an input color gamut reproducible by an input device into a color in an output color gamut in accordance with the set combination of droplet diameters.

BRIEF DESCRIPTION OF THE DRAWINGS

An exemplary embodiment of the present invention will be described in detail based on the following figures, wherein:

FIG. 3 is a diagram illustrating an example of a droplet diameter combination table;

FIG. 5 is a diagram illustrating a modification of the combination table;

DETAILED DESCRIPTION

Figure 1:
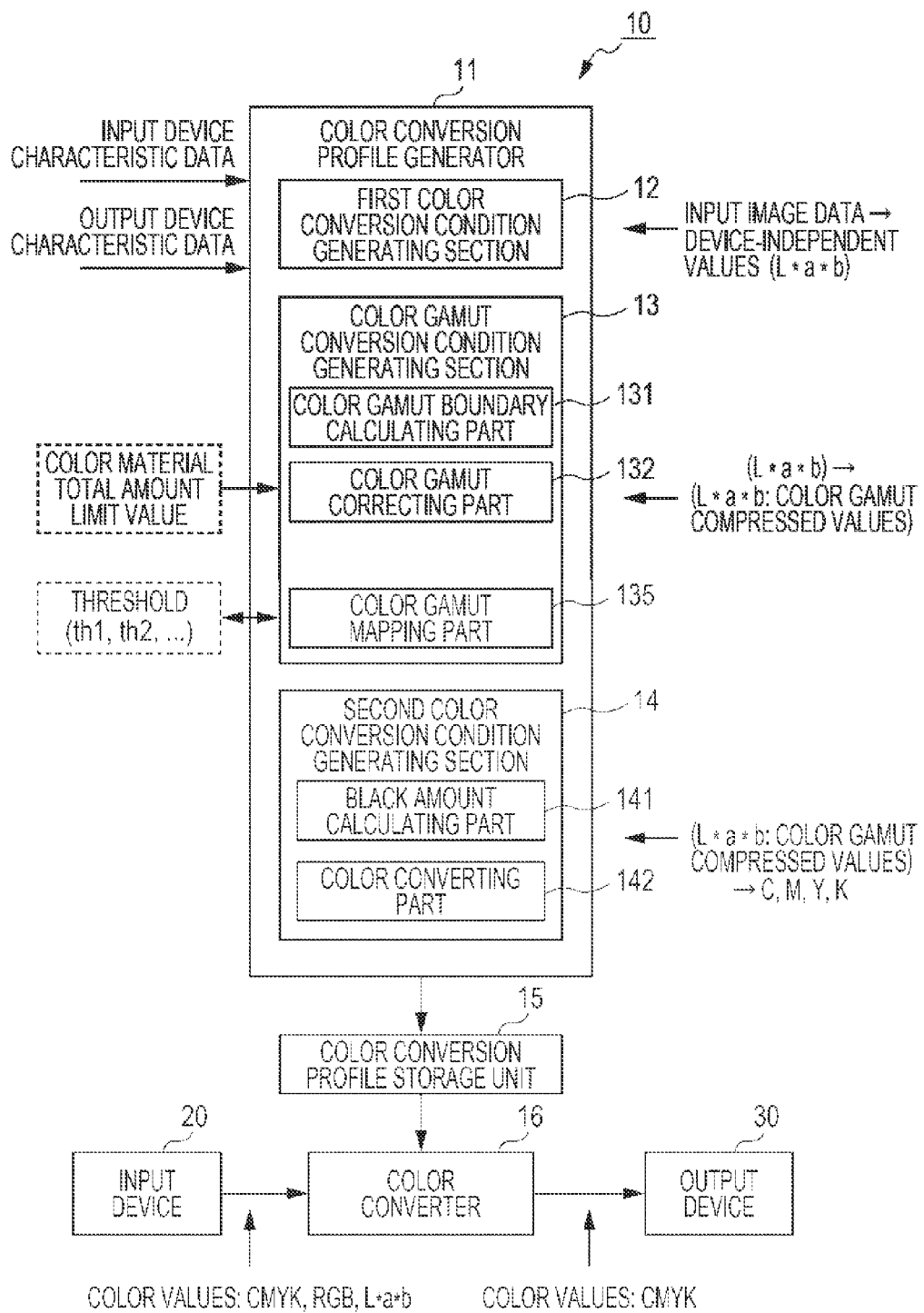
FIG. 1 is a functional block diagram of a color processing apparatus.

FIG. 1 is a block diagram illustrating the functional configuration of a color processing apparatus 10 according to an exemplary embodiment.

The color processing apparatus 10 includes a color converter 16, a color conversion profile storage unit 15, and a color conversion profile generator 11. The color converter 16 is provided between an input device 20 and an output device 30. The color converter 16 performs color conversion processing of image data input from the input device 20. The color conversion profile storage unit 15 stores a reference table (color conversion profile) to which the color converter 16 refers upon color conversion of image data. The color conversion profile generator 11 generates a color conversion profile stored in the color conversion profile storage unit 15.

The color processing apparatus 10 is realized by being included in the output device 30. In the exemplary embodiment, for example, the case in which a color inkjet printer is used as the output device 30 will be described. The color inkjet printer forms a color image on a sheet by using inks of cyan, magenta, yellow, and key (black) (CMYK) colors. The color inkjet printer is capable of making the droplet diameter different for inks of the individual colors. In the exemplary embodiment, the case will be described in which the color inkjet printer capable of selecting and ejecting three types of droplet diameters, namely, large, medium, and small droplets, for inks of the individual colors is used.

The input device 20 may be, for example, an information processing terminal (client) realized using a personal computer (PC) or the like, or an image forming apparatus (color copy machine) that has a color gamut different from that of the output device 30.

When the input device 20 is the above-described client, image data in the red, green, and blue (RGB) color space, which is generated by a user who checks the colors on a display of the client, is input as a target of color gamut conversion to the color converter 16. Alternatively, when the input device 20 is another image forming apparatus, the image forming apparatus inputs image data in the CMYK color space as a target of color gamut conversion to the color converter 16.

In the color processing apparatus 10, the color conversion profile generator 11 includes a first color conversion condition generating section 12, a color gamut conversion condition generating section 13, and a second color conversion condition generating section 14. The first color conversion condition generating section 12 converts color values (such as R, G, and B) of image data input from the input device 20 into color values in a device-independent color space (such as the L*a*b space) that does not depend on the output device 30, which reproduces multiple colors based on multiple color (C, M, Y, and K colors in this example) elements. The color gamut conversion condition generating section 13 converts the color values of the input image data, which have been obtained as a result of conversion by the first color conversion condition generating section 12, into color values in the output color gamut of the output device 30, in the same color space (the L*a*b space). The second color conversion condition generating section 14 converts the color values in the L*a*b space, which have been obtained as a result of conversion by the color gamut conversion condition generating section 13, into color values in, for example, the CMYK color space, which are reproducible by the output device 30.

In a color conversion profile generating process, the color conversion profile generator 11 obtains input device characteristic data and output device characteristic data via, for example, a network. The input device characteristic data includes information necessary for calculating the boundary of a reproducible color gamut (input color gamut) in the above-described device-independent color space of the input device 20. The output device characteristic data includes information necessary for calculating the boundary of a reproducible color gamut (output color gamut) in the above-described device-independent color space of the output device 30.

In the color conversion profile generator 11, the color gamut conversion condition generating section 13 includes a color gamut boundary calculating part 131, a combination table obtaining part 132, and a color gamut mapping part 135. The color gamut boundary calculating part 131 calculates pixels (color values) in the color gamut reproducible by the input device 20 on the basis of the input device characteristic data, and calculates the boundary of the output color gamut of the output device 30 on the basis of the output device characteristic data. The combination table obtaining part 132 obtains a combination table that defines in advance a corresponding relationship between the total amount limit value of inks of the C, M, Y, and K colors and a combination in which, among droplet diameters of inks of the C, M, Y, and K colors, droplet diameters of at least two or more inks are made uniform, and the types of droplet diameters of inks of the multiple colors are two or fewer types. The color gamut mapping part 135 converts (maps) color values of all pixels in the input color gamut into color values in the output color gamut. Note that the total amount limit value is a value for limiting the total amount of the C, M, Y, and K color materials, and is set, for example, by a user. For example, when 100% of all the C, M, Y, and K colors are to be used, the total amount limit value is set to 400. To limit the ink total amount, the total amount limit value is set to a smaller value.

Further in the color conversion profile generator 11, the second color conversion condition generating section 14 includes a black amount calculating part 141, and a color converting part 142. The black amount calculating part 141 calculates the black amount from, for example, the total amount limit value set in advance (or stored in a memory or the like) in the output device 30. The color converting part 142 converts the color values mapped, by the color gamut mapping part 135 in the color gamut conversion condition generating section 13, to the output color gamut of the output device 30 into values in the CMYK color space of the output device 30 by reflecting the black amount calculated by the black amount calculating part 141.

Although the term "black" includes the meaning "the color of the 100%-black color material", the term "black" in the exemplary embodiment means "a color with the lowest lightness reproducible by the output device 30, on the cross-section of the color gamut" on the "cross-section of the color gamut of the output device 30" described later.

Next, as the operation of the exemplary embodiment, a color conversion condition generating process will be described with reference to the flowchart illustrated in FIG. 2.

Figure 2:
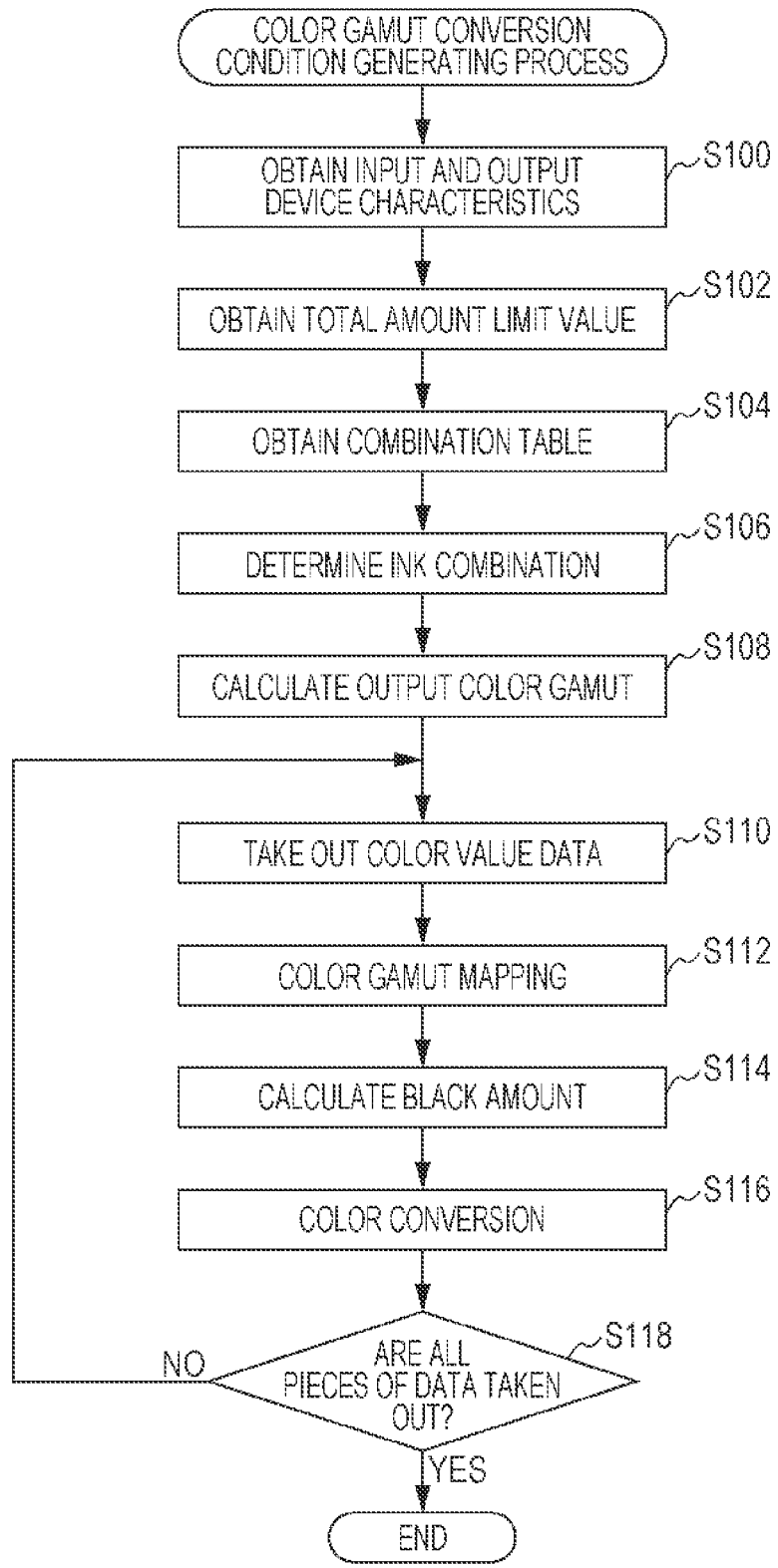
FIG. 2 is a flowchart illustrating a color gamut conversion condition generating process.

As illustrated in FIG. 2, the color gamut conversion condition generating section 13 obtains input device characteristic data and output device characteristic data (step S100).

Next, the color gamut conversion condition generating section 13 obtains the total amount limit value as information regarding limitation of the ink total amount (step S102). The total amount limit value may be set, for example, by a user. Alternatively, the corresponding relationship between, for example, a print purpose or print sheet and the total amount limit value may be determined in advance, and the total amount limit value in accordance with the set print purpose or print sheet may be automatically set.

Next, the color gamut conversion condition generating section 13 obtains the combination table (step S104). FIG. 3 illustrates an example of the combination table. As illustrated in FIG. 3, a combination table TBL is a table that determines in advance a corresponding relationship between the total amount limit value of inks of the C, M, Y, and K colors and a combination in which, among droplet diameters of inks of the C, M, Y, and K colors ejectable to satisfy the total amount limit value, droplet diameters of at least two or more inks are made uniform, and the types of droplet diameters of inks of the multiple colors are two or fewer types. As illustrated in FIG. 3, for example, the combination No. 1 is a combination in which the diameters of inks of the C, M, Y, and K colors are all large, which corresponds to the case in which the total amount limit value is set to 400. The corresponding relationship between the total amount limit value and the combination of droplet diameters is determined in advance as the most appropriate combination. Note that the combination table TBL may be stored in advance in the color processing apparatus 10, or may be obtained from an external device via, for example, a network.

On the basis of the obtained combination table TBL, the color gamut conversion condition generating section 13 sets the combination of droplet diameters, which corresponds to the ink total amount limit value (step S106). For example, as illustrated in FIG. 3, when the total amount limit value is 360, the combination in which the droplet diameters of C, M, and K are large and the droplet diameter of Y is medium is set.

To set the combination of droplet diameters on the basis of the combination table TBL, the combination in which the droplet diameters of C, M, and Y satisfying the total amount limit value may be set, while the droplet diameter of K is fixed to be large. Accordingly, when data to be printed is a text document or the like, characters in black are printed in darker black.

Alternatively, to set the combination of droplet diameters on the basis of the combination table TBL, the droplet diameter of K satisfying the total amount limit value may be set, while the droplet diameters of C, M, and Y are fixed to be large. Accordingly, when data to be printed is a barcode or the like, the occurrence of blurring of the barcode is suppressed.

To realize color reproduction of secondary colors in which gradation level differences in a low-lightness region are eliminated or reduced without lowering the quality of characters or line drawings, when data to be printed includes characters and/or lines, the droplet diameters of C, M, Y, and K may all be set to be the same diameter, provided that the total amount limit value is satisfied.

Next, the color gamut conversion condition generating section 13 calculates the output color gamut in accordance with the set combination of droplet diameters of inks of the C, M, Y, and K colors, on the basis of the output device characteristic data (step S108).

Next, the color gamut conversion condition generating section 13 takes out pixels corresponding to the processing order (counted by, for example, a pixel counter) one at a time from among all the pixels in the input color gamut, which are image data serving as a target of color gamut conversion (step S110). A color gamut conversion process (steps S112 to S118) of converting each such pixel into values in the output color gamut is executed.

In this color gamut conversion (mapping) process, for example, mapping processing is done to minimize the color difference before and after the conversion by using, for example, a predetermined color difference equation (step S112). Note that the mapping method is not limited to the foregoing method, and various known methods may be used.

Next, the second color conversion condition generating section 14 calculates the black amount from the total amount limit value (step S114), and converts the color values mapped to the output color gamut of the output device 30 into values in the CMYK color space of the output device 30 by reflecting the calculated black amount in the color values mapped to the output color gamut of the output device (step S116).

In general, when two or more different ink droplets are ejected, the roughness or unevenness may become striking in reproduction of characters or lines due to differences in the ejection speed of ejecting the two or more different ink droplets from a recording head or due to the occurrence of screen unevenness, which may result in deterioration of the image quality. This deterioration is caused by different ink ejection speeds according to the diameters of ink droplets to be ejected, which leads to misaligned landing positions of the ejected ink droplets. In contrast, in the exemplary embodiment, the combination of droplet diameters of inks of the C, M, Y, and K colors appropriate for the total amount limit value is set on the basis of the combination table TBL, and the output color gamut corresponding to the set combination is calculated and the color gamut mapping is done. Therefore, the occurrence of gradation level differences is suppressed.

Although it has been described that the total amount limit value is set, for example, by a user, and the total amount limit value is set to 400 in order to use 100% of all the C, M, Y, and K colors, and the total amount limit value is set to a smaller value in order to limit the ink total amount, the settings of the total amount limit value are not limited to the above case. For example, a condition in which 100% of all the C, M, Y, and K colors are used and the total amount limit value is set to 200 may be permitted. In this case, only when the ink total amount exceeds 200, the amount of ink of at least one of the C, M, Y, and K colors is reduced so that the ink total amount becomes 200 or less. Accordingly, 100% of inks of the individual colors are usable up to the secondary colors (colors reproduced by inks of two colors).

Figures 4A, 4B:
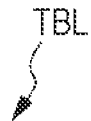
FIG. 4A is a diagram illustrating a modification of the combination table.
FIG. 4B is a diagram illustrating an example of the relationship between the droplet diameter of ink of each color and the amount of ink.

FIG. 4A illustrates an example of the combination table TBL used when 100% use of all the C, M, Y, and K colors (large droplets are used for all the colors) and setting the total amount limit value to 200 are permitted. FIG. 4B illustrates an example of the relationship between the droplet diameters of inks of the individual colors and the amount of ink. In this case, the combination of droplet diameters of inks of the C, M, Y, and K colors, in which a combination of arbitrarily two colors satisfies the total amount limit value or smaller, is selected from the combination table TBL. For example, when the total amount limit value is 190, the diameters of C, M, Y, and K droplets are medium, medium, medium, and large. Hence, the combination of CMYK droplet diameters is selected from among combinations including any of the following in which the total amount of two colors is less than or equal to 190: C and M (C+M=165%), C and Y (C+Y=170%), C and K (C+K=170%), M and Y (M+Y=175%), M and K (M+K=185%), and Y and K (Y+K=180%). When the color material total amount limit value is 180, as described above, Y+K=190%, which exceeds the color material total amount limit value and are thus unselectable.

In the exemplary embodiment, the case in which the total amount limit value is used as information regarding limitation of the ink total amount has been described. That is, in the exemplary embodiment, the case has been described in which the combination table TBL is a table in which the corresponding relationship between the total amount limit value of inks of the C, M, Y, and K colors and a combination in which, among droplet diameters of inks of the C, M, Y, and K colors ejectable to satisfy the total amount limit value, droplet diameters of at least two or more inks are made uniform, and the types of droplet diameters of inks of the multiple colors are two or fewer types, is determined in advance. Alternatively, the combination table TBL may be defined using, instead of the total amount limit value as information regarding limitation of the ink total amount, a print purpose (such as a barcode, text, photograph, etc.). Alternatively, the combination table TBL may be defined using, instead of the total amount limit value as information regarding limitation of the ink total amount, the ink total amount (in pikoliters) corresponding to the total amount limit value. Alternatively, for example, as illustrated in FIG. 5, the ink total amount may be divided into N steps (N is a positive number; N=10 in an example illustrated in FIG. 5) as ink amount conditions, and the combination table TBL may be defined. In this case, although colors reproduced by secondary or higher colors are limited, the quality of gradation reproduction or line reproduction is prevented from deteriorating. That is, line misalignment or the like due to differences in the ink ejection speed is suppressed.

Figure 6:
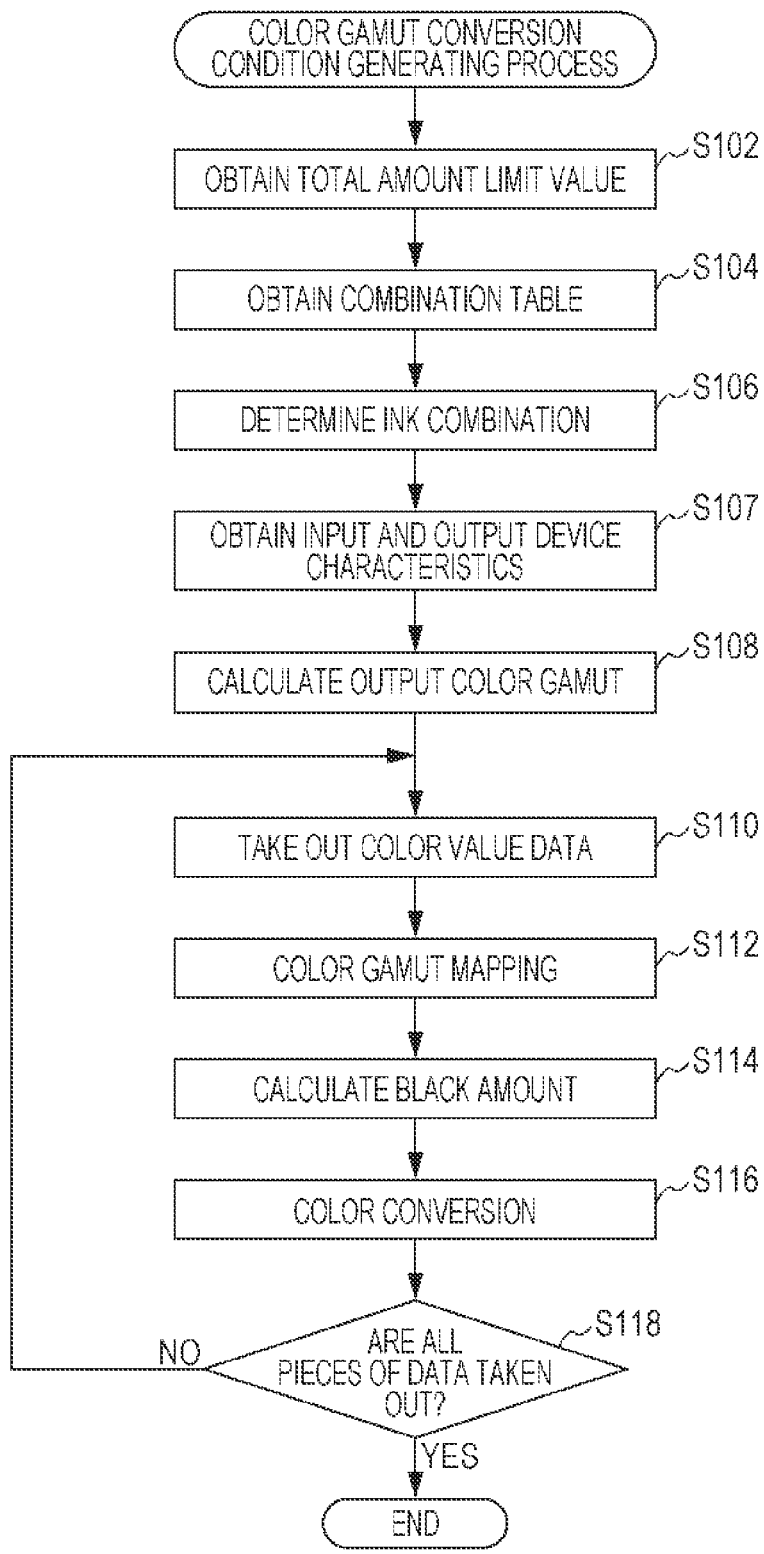
FIG. 6 is a flowchart illustrating a color gamut conversion condition generating process according to a modification.

In the exemplary embodiment, the case in which input device characteristic data and output device characteristic data are obtained in the first step, namely, step S100, as illustrated in FIG. 2, has been described. Alternatively, as illustrated in FIG. 6, input device characteristic data and output device characteristic data may be obtained after the combination of droplet diameters of inks of the individual colors is obtained in step S106.

Output device characteristic data is normally obtained by measuring density patch images of droplets with various diameters, which are output from the output device 30. In this case, after the combination of droplet diameters of inks of the individual colors is set, the output device 30 outputs the ink droplets, which are then measured to obtain the output device characteristic data. In this way, the ink simulation accuracy (accuracy of matching output colors with input colors) is improved by obtaining the output device characteristic data after setting the combination of ink droplet diameters to an optimal combination.

When the output device characteristic data is obtained by measuring the density patch images that are output before the total amount limit value is obtained, for example, density patch images of droplets with diameters unnecessary for ink simulation may be measured, or density patch images of droplets with necessary diameters may not be measured. In contrast, when the output device characteristic data is obtained after the combination of ink droplet diameters is set to an optimal combination as above, it becomes possible to output and measure density patch images optimal for the combination of ink droplet diameters.

Note that, as a method of generating density patch images, there is a method of calculating again the density patch images in the case where, for example, the combination of droplet diameters of the C, M, Y, and K colors is such that the diameters of C, M, Y, and K droplets are all set to medium, the maximum appropriate amount of C and M medium droplets (the ratio of the density of a solid image output with medium-diameter droplets to the 100% density of a solid image output with large-diameter droplets) is 90%, and the maximum appropriate amount of Y and K is 95%. In this method, the density patch images are calculated again by multiplying C and M data of the original density patch images by 0.9 times, and multiplying Y and K data of the original density patch images by 0.95 times. In this case, it is assumed that the maximum appropriate amounts of medium and small droplets are measured and stored in advance.

Alternatively, the color converter 16 may include a look-up table for color conversion in accordance with the maximum appropriate amount of each droplet diameter. Input CMYK color values may be converted in accordance with the set combination of droplet diameters of the individual colors. For example, in the above-described example, when the combination of droplet diameters of the C, M, Y, and K colors is such that all the diameters of C, M, Y, and K droplets are set to medium, and the maximum appropriate amount of C and M medium-diameter droplets is 90% and the maximum appropriate amount of Y and K medium-diameter droplets is 95%, the color converter 16 may multiply the input C and M color values by 0.9 times, and multiply the input Y and K color values by 0.95 times, by using the above-described look-up table. The color converter 16 may output the set maximum appropriate amounts of droplet diameters of the individual colors to the output device 30, and the output device 30 may select a screen pattern in accordance with the maximum appropriate amount of each droplet diameter and output a density patch image. For example, in the above-described example, when all the diameters of the C, M, Y, and K droplets are set to medium, and when the maximum appropriate amount of C and M medium-diameter droplets is 90% and the maximum appropriate amount of Y and K medium-diameter droplets is 95%, these maximum appropriate amounts are output to the output device 30. For C and M, the output device 30 selects a screen pattern in which the density becomes 90%, and outputs density patch images. For Y and K, the output device 30 selects a screen pattern in which the density becomes 95%, and outputs density patch images.

Figure 7:
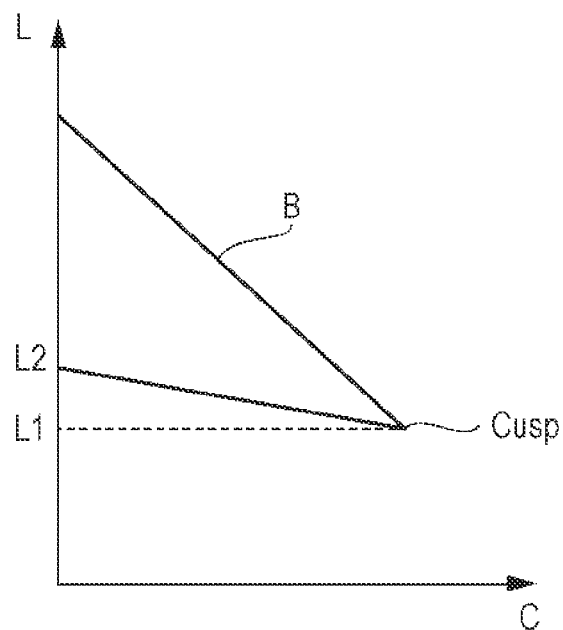
FIG. 7 is a diagram for describing the case in which lightness inversion occurs in an output color gamut.

Alternatively, for example, as illustrated in FIG. 7, when a lightness L1 of a highest-chroma color Cusp on an LC cross-section in the L*a*b space of an output color gamut B calculated in step S108 is lower than a lowest-lightness L2 on the L-axis, that is, when lightness inversion is occurring, a combination of droplet diameters in which such lightness inversion does not occur, that is, a combination of droplet diameters in which the lowest-lightness L2 on the L-axis is less than or equal to the lightless L1 of the highest-chroma color Cusp, may be set again. For example, a combination in which K droplets with a small diameter are not used is set. When K droplets with a small diameter are used, a combination that does not use C, M, and Y droplets with a large diameter, but uses C, M, and Y droplets with a medium diameter is set.

Although the case in which the combination table TBL is stored in advance in the color processing apparatus 10 or obtained from an external device via a network has been described in the exemplary embodiment, the combination table TBL may be generated on the basis of the results of measurements of colors of patch images printed with a combination of desired droplet diameters.

Figure 8:
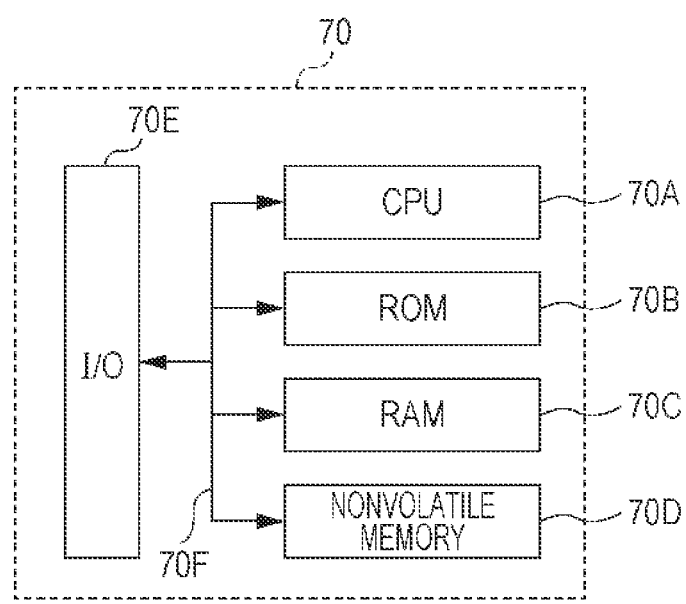
FIG. 8 is a block diagram of a color processing apparatus configured using a computer.

The color processing apparatus 10 is realized as a configuration including a computer 70 illustrated in FIG. 8. The computer 70 illustrated in FIG. 8 includes a central processing unit (CPU) 70A, a read-only memory (ROM) 70B, a random-access memory (RAM) 70C, a nonvolatile memory 70D, and an input/output (I/O) interface 70E, which are interconnected via a bus 70F. In this case, a program causing the computer 70 to execute the color gamut conversion condition generating process, illustrated in FIG. 2, is written to, for example, the nonvolatile memory 70D, and the CPU 70A is caused to execute the program. In this way, the computer 70 functions as the color processing apparatus 10. Alternatively, the program may be provided via a recording medium, such as a compact-disc read-only memory (CD-ROM) or a digital versatile disc read-only memory (DVD-ROM).

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A color processing apparatus comprising:
an obtaining unit configured to obtain a corresponding relationship between:
total amount limit information regarding a limit of a total amount of inks of a plurality of colors; and
a combination of droplet diameters in which, from among droplet diameters of the inks ejectable to satisfy the total amount limit information, droplet diameters of two or more inks have a same size and, collectively, there are two or less types of droplet diameters selected from among at least a first type having a first size range, a second type having a second size range, and a third type having a third size range;
a setting unit configured to set, based on the corresponding relationship obtained by the obtaining unit, the combination of droplet diameters corresponding to the total amount limit information; and
a color converting unit configured to convert, in accordance with the set combination of droplet diameters, a color in an input color gamut that is reproducible by an input device into a color in an output color gamut,
wherein the setting unit is configured to set, based on the corresponding relationship obtained by the obtaining unit, the combination of droplet diameters so that a lowest lightness on an achromatic color axis in a predetermined color space in the output color gamut is less than or equal to lightness of a highest-chroma color in the output color gamut.

2. The color processing apparatus according to claim 1, wherein the total amount limit information includes a total amount limit value of inks of the plurality of colors, and the plurality of colors include black, and
wherein the setting unit is configured to set, based on the corresponding relationship obtained by the obtaining unit, the combination of droplet diameters so that the diameter of a black droplet is a maximum size of the respective size range.

3. The color processing apparatus according to claim 1, wherein the total amount limit information includes a total amount limit value of inks of the plurality of colors, and the plurality of colors include black, and
wherein the setting unit is configured to set, based on the corresponding relationship obtained by the obtaining unit, the combination of droplet diameters so that the diameter of a black droplet is smaller than the diameter of a droplet in a color other than black.

4. A non-transitory computer readable medium storing a program causing a computer to execute a process, the process comprising:
obtaining a corresponding relationship between total amount limit information regarding a limit of a total amount of inks of a plurality of colors, and a combination of droplet diameters in which, from among droplet diameters of the inks ejectable to satisfy the total amount limit information, droplet diameters of two or more inks have a same size and, collectively, there are two or less types of droplet diameters selected from among at least a first type having a first size range, a second type having a second size range, and a third type having a third size range;

setting, based on the corresponding relationship between the total amount limit information and the combination of droplet diameters, the combination of droplet diameters corresponding to the total amount limit information; and converting, in accordance with the set combination of droplet diameters, a color in an input color gamut that is reproducible by an input device into a color in an output color gamut, wherein the combination of droplet diameters is set so that a lowest lightness on an achromatic color axis in a predetermined color space in the output color gamut is less than or equal to lightness of a highest-chroma color in the output color gamut.

5. A color processing apparatus comprising:

an obtaining unit configured to obtain a corresponding relationship between:

total amount limit information regarding a limit of a total amount of inks of a plurality of colors; and a combination of droplet diameters in which, from among droplet diameters of the inks ejectable to satisfy the total amount limit information, droplet diameters of two or more inks have are uniform and, collectively, there are two or less types of droplet diameters;

a setting unit configured to set, based on the corresponding relationship obtained by the obtaining unit, the combination of droplet diameters corresponding to the total amount limit information; and a color converting unit configured to convert, in accordance with the set combination of droplet diameters, a color in an input color gamut that is reproducible by an input device into a color in an output color gamut, wherein the setting unit is configured to set, based on the corresponding relationship obtained by the obtaining unit, the combination of droplet diameters so that a lowest lightness on an achromatic color axis in a predetermined color space in the output color gamut is less than or equal to lightness of a highest-chroma color in the output color gamut.

\* \* \* \* \*